(12) United States Patent
Wu et al.

(10) Patent No.: US 7,259,598 B2
(45) Date of Patent: Aug. 21, 2007

(54) CLOCK SWITCHING CIRCUIT

(75) Inventors: Jian-Hua Wu, Lujhu Township, Taoyuan County (TW); Wei Hwang, La Verne, CA (US)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 11/406,312

(22) Filed: Apr. 19, 2006

(65) Prior Publication Data

US 2007/0152719 A1 Jul. 5, 2007

(30) Foreign Application Priority Data

Dec. 30, 2005 (TW) .............................. 94147724 A

(51) Int. Cl.
*G06F 1/08* (2006.01)
*H03K 17/00* (2006.01)

(52) U.S. Cl. ......................... 327/99; 327/298; 327/407

(58) Field of Classification Search .................... 327/3, 327/99, 141, 144, 145, 291, 293, 294, 298, 327/407

See application file for complete search history.

(56) References Cited

U.S. PATENT DOCUMENTS

| 5,623,223 | A | * | 4/1997 | Pasqualini | 327/298 |
| 5,726,593 | A | * | 3/1998 | Ruuskanen | 327/99 |
| 5,926,044 | A | * | 7/1999 | Niimura | 327/99 |
| 6,107,841 | A | * | 8/2000 | Goodnow | 327/99 |
| 6,501,304 | B1 | * | 12/2002 | Boerstler et al. | 327/99 |
| 6,600,345 | B1 | * | 7/2003 | Boutaud | 327/99 |
| 6,784,699 | B2 | * | 8/2004 | Haroun et al. | 327/99 |
| 6,806,755 | B1 | * | 10/2004 | Simmonds | 327/298 |
| 2004/0095166 | A1 | | 5/2004 | Yamazaki | |
| 2004/0263217 | A1 | | 12/2004 | Hutson et al. | |

* cited by examiner

*Primary Examiner*—Linh My Nguyen
*Assistant Examiner*—Patrick O'Neill
(74) *Attorney, Agent, or Firm*—Rosenberg, Klein & Lee

(57) ABSTRACT

The present invention discloses a clock switching circuit, which comprises: a clock generator, receiving two different clock signals; a logic gate, coupled to an enable-signal generator and an output-clock generator, wherein during clock switching, the logic gate turns off output clock according to the signal edges of those two clock signals to avoid the problems of clock glitch and timing insufficiency, and the logic gate will not restore clock output until an appropriate timing occurs.

8 Claims, 5 Drawing Sheets

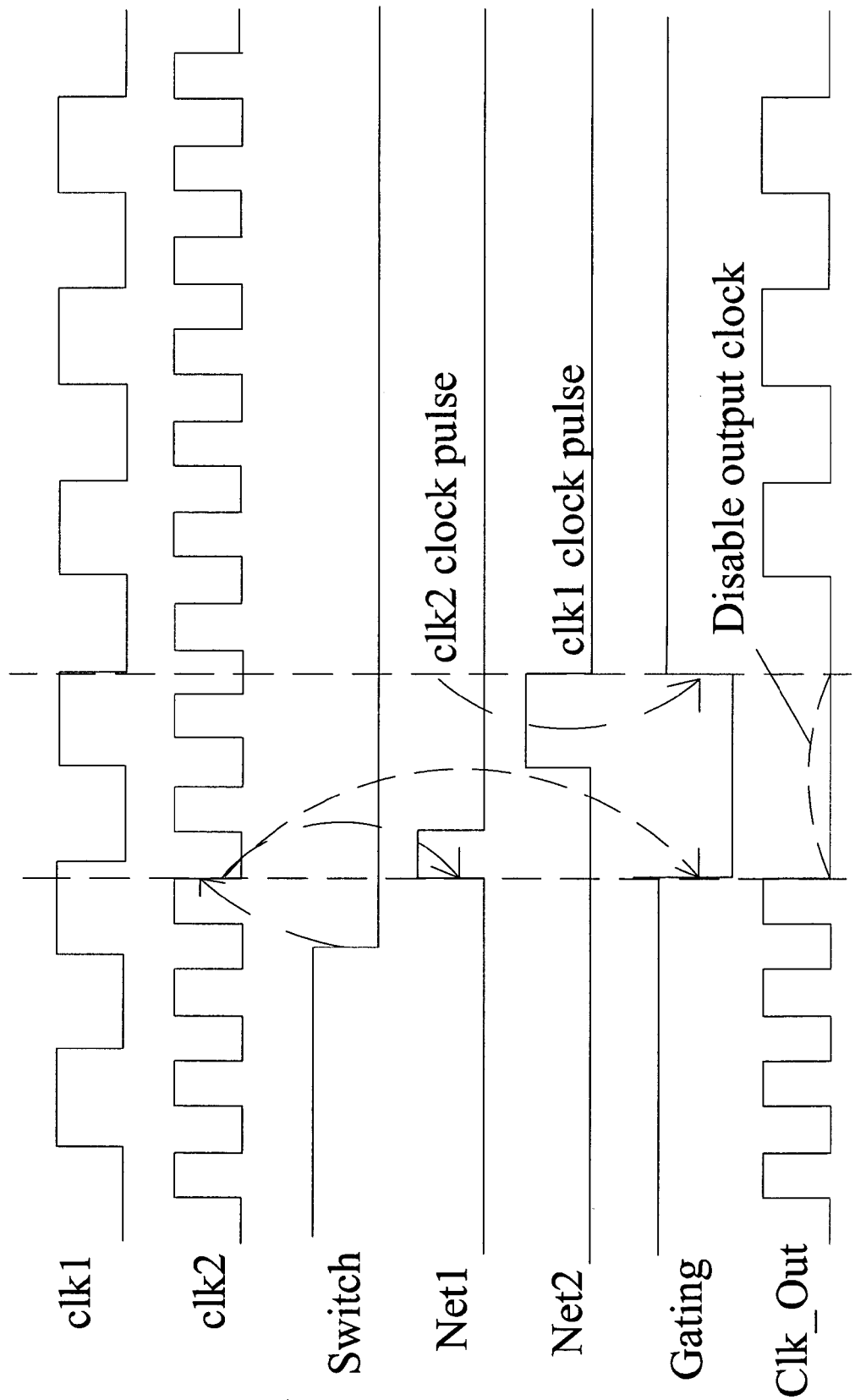

CLOCK SWITCHING CIRCUIT

BACKGROUND OF THE INVENTION

1. Field of the Invention

The present invention relates to a clock switching circuit, particularly to a clock switching circuit, which can switch multiple dynamic clocks.

2. Description of the Related Art

In IC design, when a system cannot manage clock switching well but has to switch between two clocks separately with different phases and speeds, the system may have the problem of clock glitch or timing insufficiency.

A clock glitch and a timing insufficiency of an output clock signal clk_out are respectively shown in FIG. 1A and FIG. 1B. In FIG. 1A and FIG. 1B, the switch signal is used to determine whether the output clock signal clk_out is clock signal 1 (clk 1) or clock signal 2 (clk 2). However, during a clock switching operation of either from clk 1 to clk 2 or from clk 2 to clk 1, the clock glitch shown in FIG. 1A or the timing insufficiency shown in FIG. 1B may occur. Therefore, a clock switching circuit, which can avoid the abovementioned problems, is necessary. The U.S. patent of Publication No. 2004/0095166A1 "Clock Switching Circuit" proposes a clock switching circuit to prevent the abovementioned problems. The circuit of the conventional technology needs an extra select signal generator to control signals; however it causes some inconveniences in usage.

Accordingly, the present invention proposes a clock switching circuit to overcome the abovementioned problems and simplify the operation of switching clock signals.

SUMMARY OF THE INVENTION

The primary objective of the present invention is to provide a clock switching circuit, whose operation is very simple and easy, and whose function is similar to a clock multiplexer.

Another objective of the present invention is to provide a clock switching circuit, which can avoid clock glitch and timing insufficiency during switching between two clock signals.

To achieve the abovementioned objectives, the present invention proposes a clock switching circuit, which can switch the output clock from an original clock signal to a new clock signal, and which comprises: a clock generator, receiving two different clock signals clk 1 and clk 2, and according to a switch signal, generating a first reference clock signal, which is congruous to the original clock signal; an enable-signal generator, coupled to the clock generator, and receiving the first reference clock signal; an output-clock generator, coupled to the clock generator and the enable-signal generator, receiving the first reference clock signal, and a logic gate, coupled to the enable-signal generator and the output-clock generator, wherein according to a respective negative edge of the original clock signal, the enable-signal generator will turn off the logic gate; according to the first reference clock signal, the output-clock generator creates a second reference clock signal, which is congruous to the new clock signal; next, the output-clock generator sends the second reference clock signal to the enable-signal generator; according to the negative edge of the second reference clock signal, the logic gate is turned on, and the logic gate outputs the new clock signal created by the output-clock generator.

To enable the objectives, technical contents, characteristics, and accomplishments of the present invention to be more easily understood, the embodiments of the present invention are to be described below in detail in cooperation with attached drawings.

BRIEF DESCRIPTION OF THE DRAWINGS

FIG. 4B is the timing diagram with respect to the process that the output clock Clk_Out is switched from the second clock signal clk 2 to the first clock signal clk 1.

DETAILED DESCRIPTION OF THE INVENTION

Figure 1A:
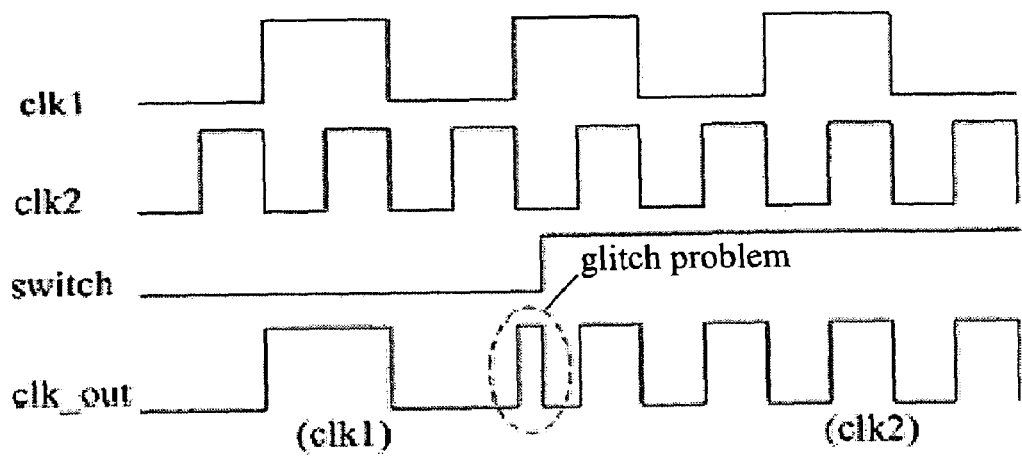
FIG. 1A is a diagram showing a clock glitch occurring during switching two clock signals in the conventional technologies.
Figure 1B:
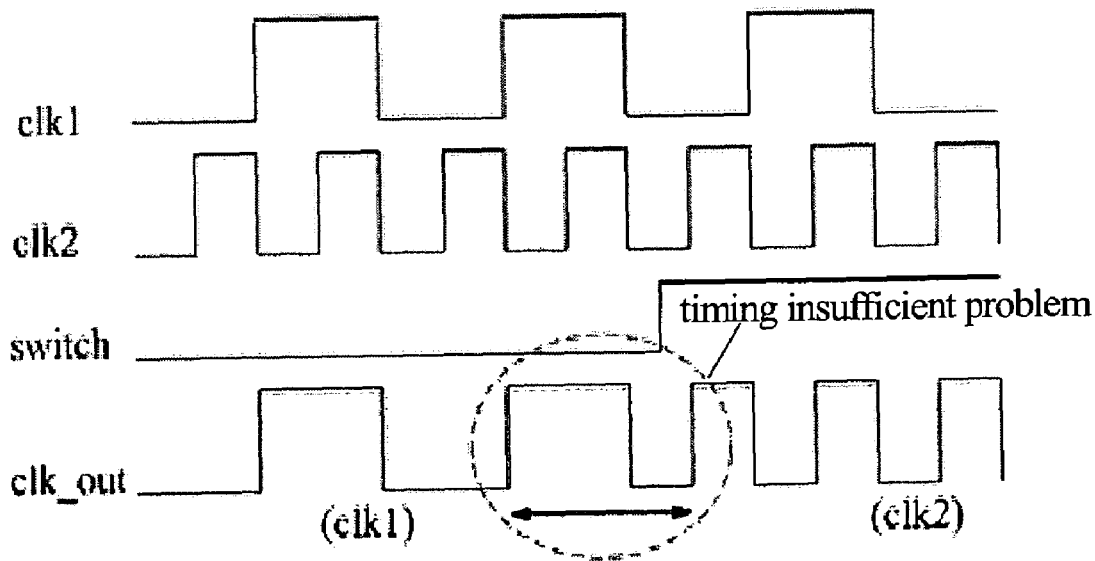
FIG. 1B is a diagram showing a timing insufficiency occurring during switching two clock signals in the conventional technologies.
Figure 2:
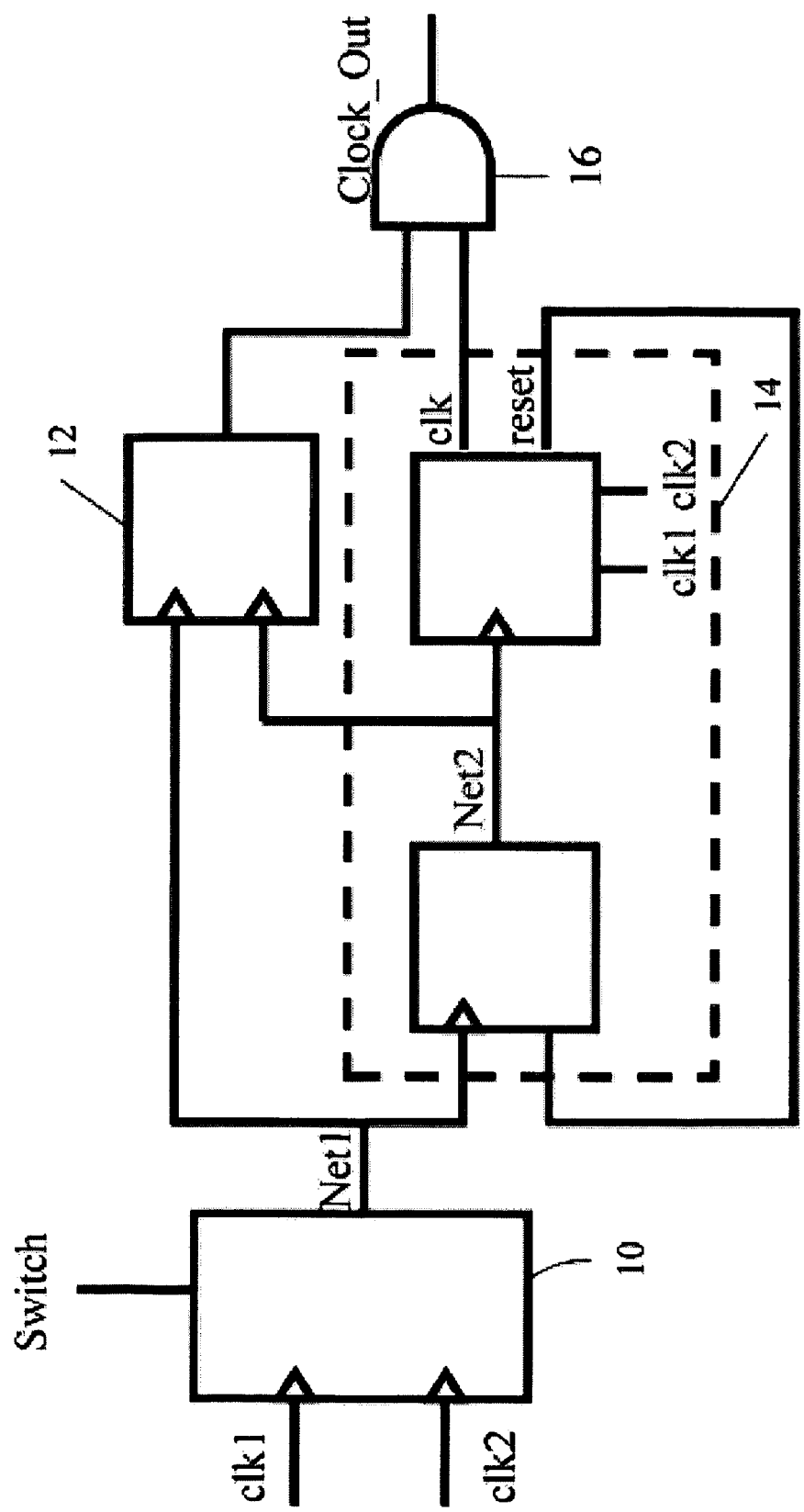
FIG. 2 is a diagram showing the clock switching circuit according to a preferred embodiment of the present invention.

Refer to FIG. 2 a diagram schematically showing the clock switching circuit according to a preferred embodiment of the present invention. The clock switching circuit according to this embodiment comprises: a clock generator 10, receiving two different clock signals—a first clock signal clk 1 and a second clock signal clk 2, and according to a switch signal Switch, generating a first reference clock signal, which is congruous to the original signal; an enable-signal generator 12, coupled to the clock generator 10, and receiving the first reference clock signal; an output-clock generator 14, coupled to the clock generator 10 and the enable-signal generator 12, receiving the first reference clock signal, and a logic gate 16, being an output AND gate, and coupled to the enable-signal generator 12 and the output-clock generator 14. According to the negative edge of the first reference clock signal, the enable-signal generator 12 turns off the output AND gate 16; according to the first reference clock signal, the output-clock generator 14 creates a second reference clock signal, which is congruous to the new clock signal; next, the output-clock generator 14 sends the second reference clock signal to the enable-signal generator 12; according to the negative edge of the second reference clock signal, the output AND gate 16 is turned on, and the output AND gate 16 outputs the new clock signal created by the output-clock generator 14. The clock generator 10, the enable-signal generator 12 and the output-clock generator 14 are coupled in a first node Net 1; the enable-signal generator 12 and the output-clock generator 14 are also coupled in a second node Net 2.

The clock generator 10 receives the first clock signal clk 1 and the second clock signal clk 2. When the switch signal Switch is to switch the output clock from the first clock signal clk 1 to the second clock signal clk 2, the clock generator 10 generates a first reference clock signal, which is congruous to the first clock signal clk 1, on the first node Net 1 according to the switch signal. The enable-signal generator 12 receives the first reference clock signal; when the first node Net 1 outputs the negative edge of the first reference clock signal, the enable-signal generator 12 turns off the output AND gate 16. According to the first reference clock signal, the output-clock generator 14 creates a second reference clock signal, which is congruous to the second clock signal clk 2, on the second node Net 2. When the second node Net 2 outputs the negative edge of the second reference clock signal, the output AND gate 16 will be turned on, and the second clock signal clk 2 created by the output-clock generator 14 will be output from the output AND gate 16. The time interval, during which the output AND gate 16 is turned off, ranges from the negative edge of the first clock signal clk 1 to the negative edge of the second clock signal clk 2. Similarly, when the clock is intended to switch from the second clock signal clk 2 to the first clock signal clk 1, the output AND gate 16 is also turned off during the clock switching operation lest clock glitch and timing insufficiency occur.

Figure 3:
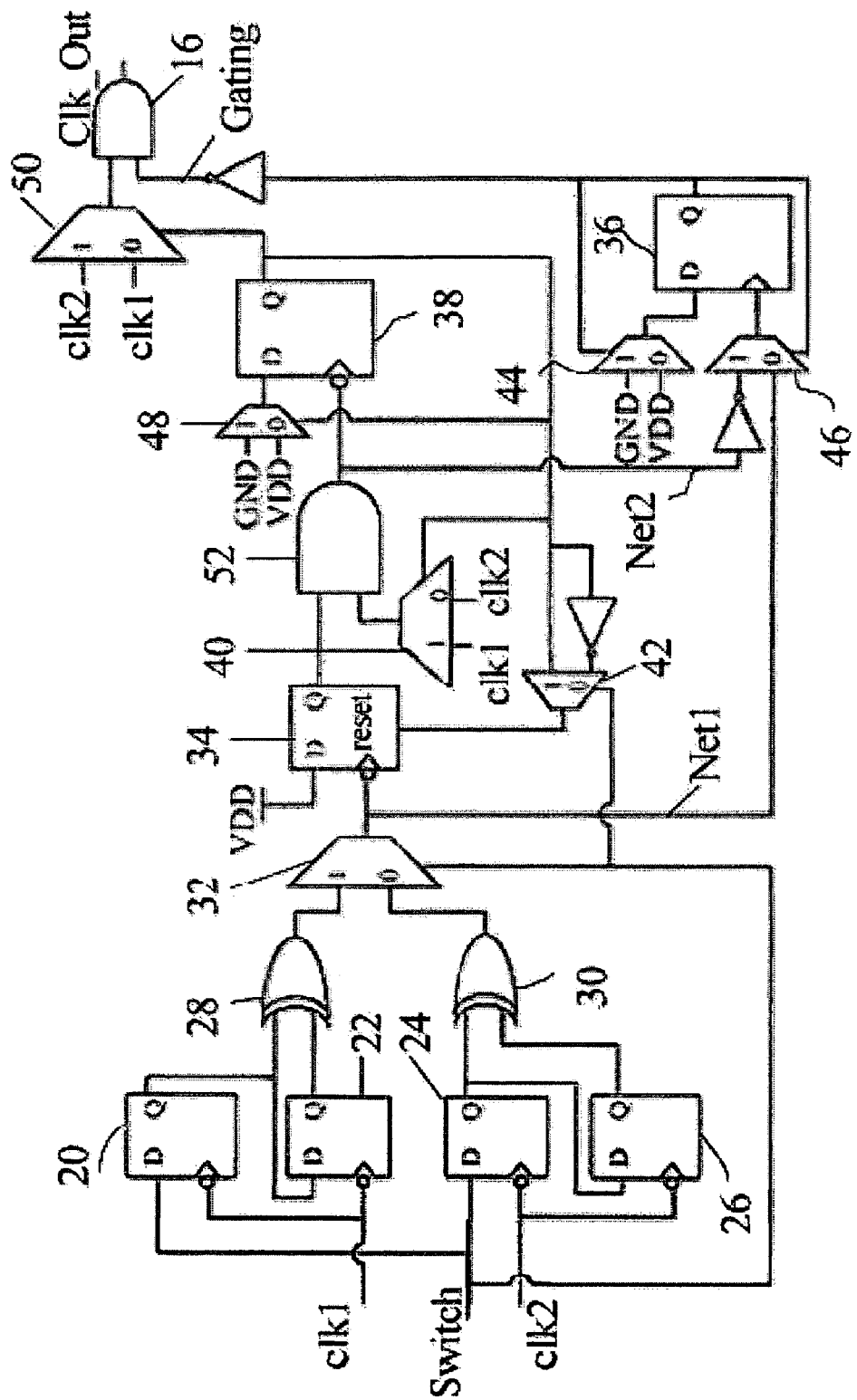
FIG. 3 is a diagram showing the detail of the clock switching circuit of FIG. 2.

Refer to FIG. 3 a diagram schematically showing the detail of the clock switching circuit of FIG. 2. The clock switching circuit of the present invention is essentially composed of logic gates and D flip-flops. The clock switching circuit receives a switch signal Switch and two clock signals separately having different phases and speeds—the first clock signal clk 1 and the second clock signal clk 2. If the output signal is to follow the first clock signal clk 1, the switch signal will take low value 0; if the output signal is to follow the second clock signal clk 2, the switch signal will take high value 1. As shown in FIG. 3, the detailed circuitry of the clock switching circuit of the present invention comprises a multiplexer 32. The multiplexer 32 is coupled to an XOR gate 28, and the XOR gate 28 is coupled to two D flip-flops 20 and 22. When a switching signal occurs, the D flip-flops 20 and 22 together with the XOR gate 28 are used to generate the first clock signal clk 1. The multiplexer 32 is also coupled to an XOR gate 30, and the XOR gate 30 is coupled to two D flip-flops 24 and 26. When a switching signal occurs, the D flip-flops 24 and 26 together with the XOR gate 30 is used to generate the second clock signal clk 2. The detailed circuitry of the clock switching circuit of the present invention also comprises: D flip-flops 34, 36, and 38; multiplexers 40, 42, 44, 46, 48, and 50; and AND gates 16 and 52. When the switching signal Switch shifts from 0 to 1, i.e. when the output clock Clk_Out is to be switched from the first clock signal clk 1 to the second clock signal clk 2, the first clock signal clk 1 is selected to output to the first node Net 1 by the multiplexer 32. When the switching signal Switch shifts from 1 to 0, i.e. when the output clock Clk_Out is to be switched from the second clock signal clk 2 to the first clock signal clk 1, the second clock signal clk 2 is selected to output to the first node Net 1 by the multiplexer 32.

Figure 4A:
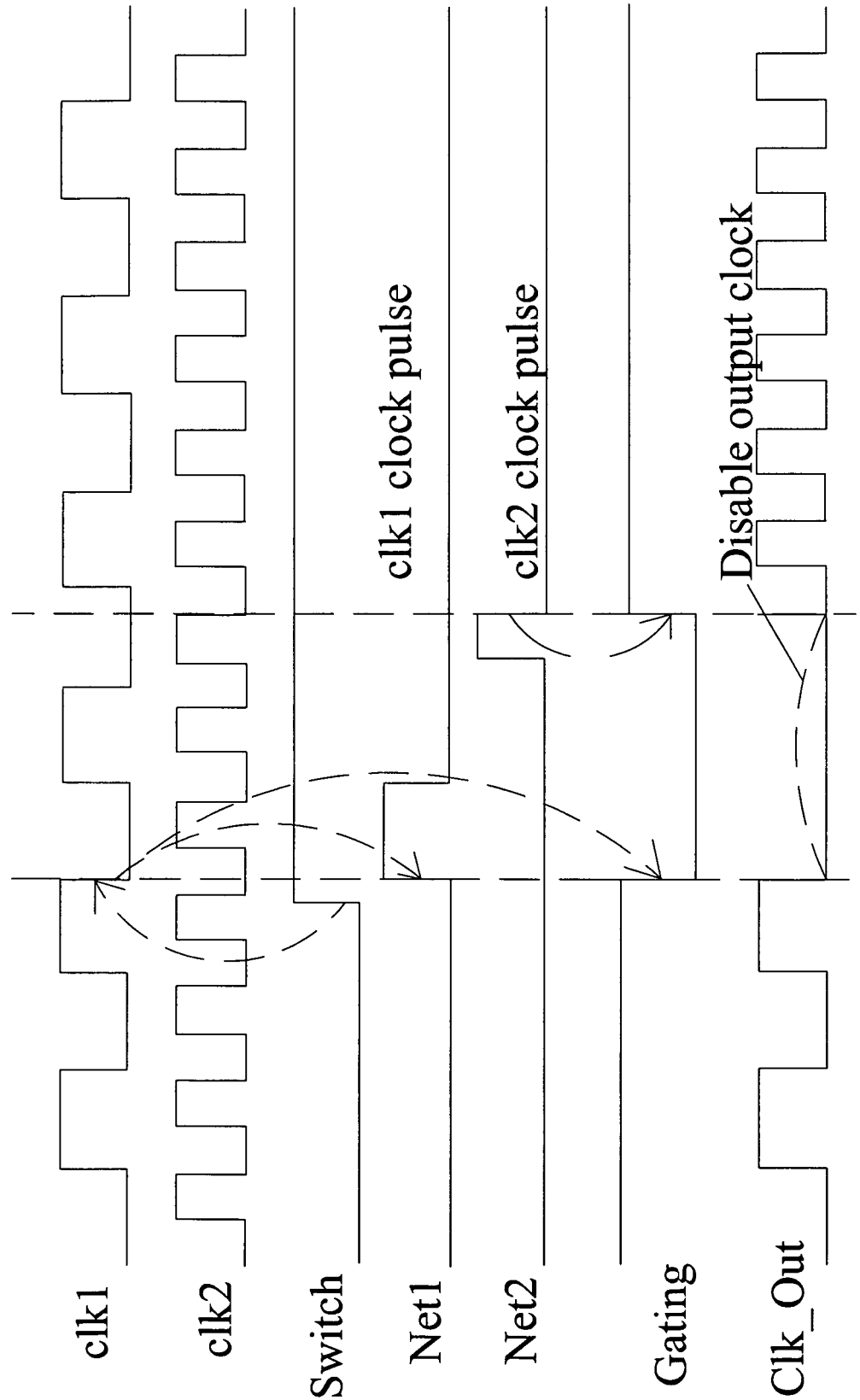
FIG. 4A is a timing diagram with respect to the process that the output clock Clk_Out is switched from the first clock signal clk 1 to the second clock signal clk 2.

Refer to FIG. 3 and FIG. 4A, wherein FIG. 4A is the timing diagram with respect to the process that the output clock Clk_Out is switched from the first clock signal clk 1 to the second clock signal clk 2. When the output clock Clk_Out is to be switched from the first clock signal clk 1 to the second clock signal clk 2, that the multiplexer 32 selects the first clock signal clk 1 to output to the first node Net 1 will trigger D flip-flop 36. When the first node Net 1 outputs a pulse corresponding to the negative edge of the first clock signal clk 1, the output AND gate 16 will be turned off; at this time, the D flip-flop 34 will also be triggered, and then the AND gate 52 will be enabled. Then, the multiplexer 40 selects the second clock signal clk 2 in its initial state, and the second clock signal clk 2 will be created on the second node Net 2. When the second node Net 2 outputs the negative edge of the second clock signal clk 2, the D flip-flops 36 and 38 will be triggered, and the output AND gate 16 will be turned on. Then, the multiplexer 50 outputs the second clock signal clk 2, which will be further output from the output AND gate 16. From the abovementioned discussion, it is known that the output AND gate 16 is turned off during the time interval between the negative edge of the first clock signal clk 1 and the negative edge of the second clock signal clk 2. Thus, the problem of clock glitch can be solved.

Refer to FIG. 3 and FIG. 4B, wherein FIG. 4B is the timing diagram with respect to the process that the output clock Clk_Out is switched from the second clock signal clk 2 to the first clock signal clk 1. When the output clock Clk_Out is to be switched from the second clock signal clk 2 to the first clock signal clk 1, the second clock signal clk 2 is selected to output to the first node Net 1 by the multiplexer 32. When the first node Net 1 outputs the negative edge of the second clock signal clk 2, the output AND gate 16 will be turned off; then, the D flip-flop 34 will be triggered, and then the AND gate 52 will be enabled. Then, the multiplexer 40 selects the first clock signal clk 1 in its initial state, and the first clock signal clk 1 will be created on the second node Net 2. When the second node Net 2 outputs the negative edge of the first clock signal clk 1, the D flip-flops 36 and 38 will be triggered, and the output AND gate 16 will be turned on. Then, the multiplexer 50 outputs the first clock signal clk 1, which will be further output from the output AND gate 16. Similarly, the output AND gate 16 is turned off during the time interval between the negative edge of the second clock signal clk 2 and the negative edge of the first clock signal clk 1.

The clock switching circuit proposed by the present invention can operate simply and functions just like a multiplexer to select the intended clock signal. Further, when the output clock is switched between two different clock signals, the clock switching circuit of the present invention utilizes an output AND gate 16 to stop the output of clock signals according to the signal edges of the switched clock signals so that the problems of clock glitch and timing insufficiency can be avoided. Furthermore, the clock switching circuit of the present invention can be expanded into a larger clock switching circuit to receive more than two clock signals. Besides, the clock switching circuit of the present invention may also be implemented with equivalent logic circuits.

The abovementioned embodiments are to clarify the present invention in order to enable the persons skilled in the art to understand, make and use the present invention; however, it is not intended to limit the scope of the present invention, and any modification and variation according to the spirit of the present invention is to be also included within the scope of the claims of the present invention.

What is claimed is:

1. A clock switching circuit, switching an output clock from an original clock signal to a new clock signal, and comprising:

a clock generator, receiving two different clock signals, and according to a switch signal, generating a first reference clock signal, which is congruous to said original clock signal;

an enable-signal generator, coupled to said clock generator, and receiving said first reference clock signal; and an output-clock generator, coupled to said clock generator and said enable-signal generator, and receiving said first reference clock signal, and a logic gate coupled to said enable-signal generator and said output-clock generator, wherein according to a respective negative edge of said original clock signal, said enable-signal generator turns off said logic gate; according to said first reference clock signal, said output-clock generator creates a second reference clock signal which is congruous to said new clock signal; next, said output-clock generator sends said second reference clock signal to said enable-signal generator; according to the negative edge of said second reference clock signal, said logic gate is turned on, and said new clock signal created by said output-clock generator is output from said logic gate.

2. The clock switching circuit according to claim 1, wherein said clock generator, said enable-signal generator and said output-clock generator are coupled in a first node; said enable-signal generator and said output-clock generator are also coupled in a second node.

3. The clock switching circuit according to claim 2, wherein said original clock signal is a first clock signal, and said new clock signal is a second clock signal; said clock generator receives said first clock signal and said second clock signal, and according to said switch signal, said clock generator generates said first reference clock signal, which is congruous to said first clock signal, on said first node; said enable-signal generator receives said first reference clock signal and turns off said logic gate when said first node outputs the positive edge of said first reference clock signal; according to said first reference clock signal, said output-clock generator generates said second reference clock signal, which is congruous to said second clock signal, on said second node; when said second node outputs the negative edge of said second reference clock signal, said logic gate is turned on, and said second clock signal output by said output-clock generator is output from said logic gate.

4. The clock switching circuit according to claim 2, wherein said original clock signal is a second clock signal, and said new clock signal is a first clock signal; said clock generator receives said first clock signal and said second clock signal, and according to said switch signal, said clock generator generates said first reference clock signal, which is congruous to said second clock signal, on said first node; said enable-signal generator receives said first reference clock signal and turns off said logic gate when said first node outputs the positive edge of said first reference clock signal; according to said first reference clock signal, said output-clock generator generates said second reference clock signal, which is congruous to said first clock signal, on said second node; when said second node outputs the negative edge of said second reference clock signal, said logic gate is turned on, and said first clock signal output by said output-clock generator is output from said logic gate.

5. The clock switching circuit according to claim 3, wherein a time interval, during which said logic gate is turned off, ranges from a respective negative edge of said first clock signal to a respective the negative edge of said second clock signal.

6. The clock switching circuit according to claim 4, wherein a time interval, during which said logic gate is turned off, ranges from a respective negative edge of said second clock signal to a respective negative edge of said first clock signal.

7. The clock switching circuit according to claim 1, which can be expanded into a larger clock switching circuit to receive more than two clock signals.

8. The clock switching circuit according to claim 1, wherein said clock generator, said enable-signal generator, and said output-clock generator can be implemented with equivalent logic circuits.

* * * * *